Figure 1:
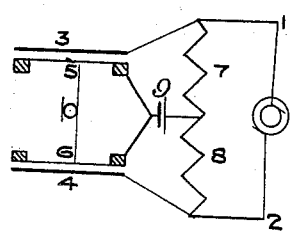

J. T. IRWIN.
ELECTRIC OSCILLOGRAPH.
APPLICATION FILED SEPT. 19, 1908.

1,074,262.  Patented Sept. 30, 1913.
2 SHEETS—SHEET 1.

Attest
E. G. Farley
A. Rettig

Inventor
John Thomas Irwin
By his atty.

J. T. IRWIN.
ELECTRIC OSCILLOGRAPH.
APPLICATION FILED SEPT. 19, 1908.

1,074,262.

Patented Sept. 30, 1913.
2 SHEETS—SHEET 2.

Attest
E. G. Farley
A. Rettig

Inventor
John Thomas Irwin
By his atty.

COLUMBIA PLANOGRAPH CO., WASHINGTON, D. C.

UNITED STATES PATENT OFFICE.

JOHN T. IRWIN, OF SOUTH KENSINGTON, LONDON, ENGLAND.

ELECTRIC OSCILLOGRAPH.

1,074,262. Specification of Letters Patent. Patented Sept. 30, 1913.

Application filed September 19, 1908. Serial No. 453,851.

*To all whom it may concern:*

Be it known that I, JOHN THOMAS IRWIN, a subject of the King of England, and a resident of South Kensington, London, England, have invented an Improvement in Electric Oscillographs, of which the following is a specification.

My invention relates to improvements in electric oscillographs and consists of certain improvements fully set forth in the following specification and shown in the accompanying drawings which form a part thereof.

My invention consists in means for measuring the functions of an electric current, such as the instantaneous potential difference between two points, or the instantaneous current flowing in a circuit, or the instantaneous power given to a circuit, even when the variation of these quantities is rapid. To accomplish these results, I provide means to measure the difference of the pulls on two stretched diaphragms, the pulls being due to the respective electrostatic pressures between the said diaphragms and two fixed bodies.

To make the difference of the pulls proportional to the instantaneous potential difference between two points, I make the potential between one diaphragm and its disk proportional to the sum of, and the potential between the other diaphragm and its disk proportional to the difference of the instantaneous potential difference which it is required to measure and a known constant potential difference, which does not vary with the variations of the potential difference which it is required to measure. The pull on one diaphragm is proportional if the movement is small, to the square of the sum of these values, and the pull on the other to the square of the difference, so that the difference in pulls is proportional to the product of the constant potential and the potential it is required to measure. The value of the constant potential difference being known, it is easy to ascertain the potential difference to be measured.

To measure the instantaneous current in a circuit, I cause to be produced a potential difference proportional to the current by passing the current through a resistance, or I may obtain a potential difference by first sending the current through a resistance and then using a transformer to increase this potential difference. Having obtained a difference of potential proportional at every instant to the electrical condition in the circuit, I then measure this difference of potential as before.

To measure the instantaneous power given to a circuit, I arrange to make the difference in potential between one diaphragm and its disk or fixed body proportional to the sum of, and the difference of the potential between the other diaphragm and its disk or fixed body proportional to the difference of the values of the instantaneous electrical pressure across the circuit and to a potential difference proportional to the instantaneous current in the circuit. The difference of the pulls will then be proportional to the product of these values, that is, to the instantaneous power given to the circuit.

Figure 2:
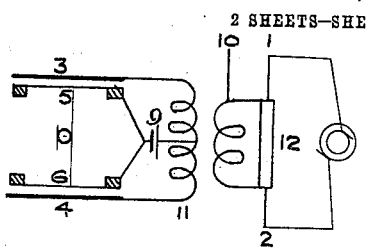
Figure 3:
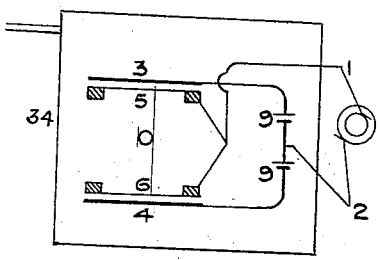
Figure 4:
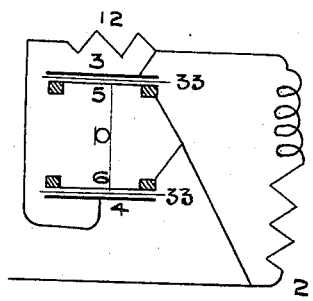
Figure 5:
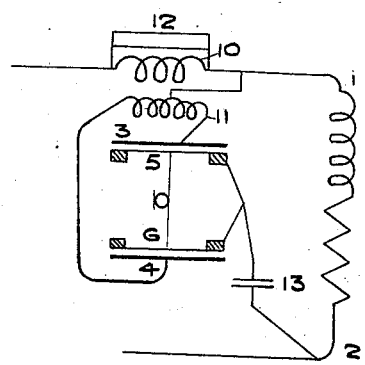
Figure 6:
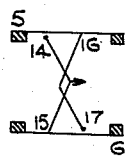
Figure 7:
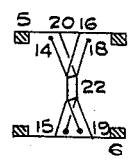
Figure 13:
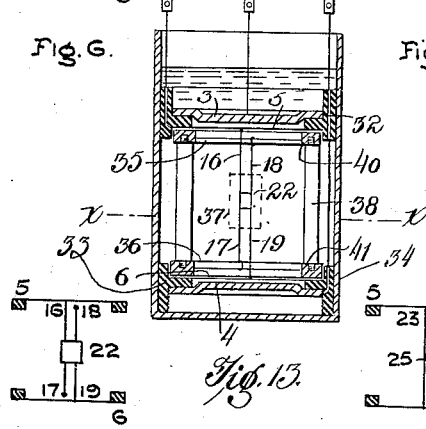
Figure 8:
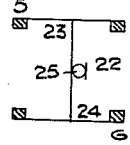
Figure 11:
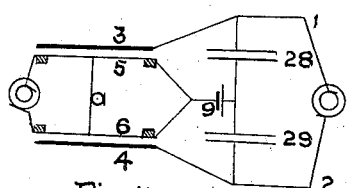
Figure 14:
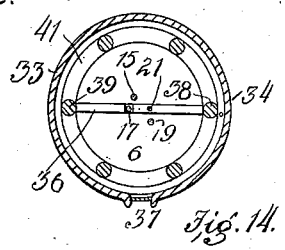
Figure 12:
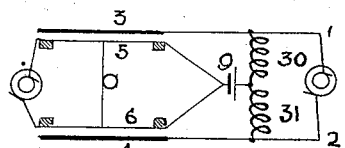
Figure 10:
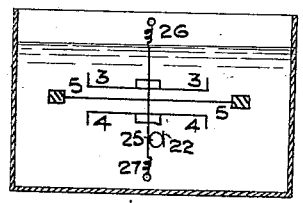

My invention will be better understood by reference to the accompanying drawings, in which:

Figure 1 is a diagrammatic illustration of my invention adapted to measure the instantaneous potential difference between two points in a circuit; Fig. 2, is a similar illustration when my invention is employed with a transformer; Fig. 3. is a modified form of my invention, diagrammatically illustrated; Fig. 4. is a diagrammatical illustration of my invention when employed to measure the instantaneous power in a circuit; Fig. 5 is a modification of the form of my invention shown in Fig. 4; Fig. 6 illustrates suitable means for indicating the difference of the pulls on two diaphragms; Fig. 7 illustrates the means shown in Fig. 6 in double form; Fig. 8 is a modified form of the arrangement of parts shown in Fig. 7; Fig. 9 is a still further modification of the means for indicating the difference of the pulls on two diaphragms; Fig. 10 is a modified form of my invention whereby a single diaphragm alone may be employed; Figs. 11 and 12 are diagrammatic illustrations of modified forms of my invention when condensers and reactive coils are respectively used in place of the non-inductive resistances shown in Fig. 1; Fig. 13 is a sectional elevation illustrating the construction of the instrument in the form which has been found to give good results; and Fig. 14 is a sectional plan view of the same on line $x$—$x$.

Fig. 1 shows diagrammatically an arrangement for carrying out my invention which enables me to measure the instantaneous potential difference between the points 1 and 2. Connected to the points 1 and 2, are two fixed disks or bodies 3 and 4; and 5 and 6 are two tightly stretched diaphragms electrically connected together but insulated from the said bodies 3 and 4. The diaphragms 5 and 6 may be made of plain sheet metal, or of finely perforated sheet metal, or of very fine wire gauze, or of any material which can be made conducting to electric currents, and are stretched and held at their edges by rigid metal frames. I have found that with this construction, the diaphragms are highly sensitive and give excellent results, the movements of the diaphragms under electro-static pressure being somewhere about 1/10,000 of an inch. Across the two points 1 and 2 are connected two equal non-inductive resistances 7 and 8, and between their junction and the diaphragms I insert some convenient apparatus 9 to give a constant potential difference equal say to P. Assuming that the instantaneous potential difference between 1 and 2 is 2V, the potential across 7 will be V and the potential across 8 will be V; then the potential difference between 3 and 5 is V+P, and the pull on the diaphragm 5 is proportional to $(V+P)^2$. The potential difference between 6 and 4 is V−P, and the pull on the diaphragm 6 is proportional to $(V-P)^2$. The difference in pulls on the two diaphragms is proportional to $$(V+P)^2 - (V-P)^2,$$

that is to 4VP, provided that the diaphragms and their distances from the disks or fixed bodies are exactly equal. To measure the instantaneous current in a circuit, it is only necessary to pass the current in at 1 and out at 2, Fig. 1. Then, since the potential difference across 1, 2 will be proportional to the current, the difference in the pulls of the two diaphragms will also be proportional to the current.

In some cases, especially with low tension alternating currents, it is necessary to use a transformer to raise or transform up the pressure due to the current in a non-inductive resistance, so as to be able to be measured on the instrument. This arrangement is shown in Fig. 2, in which 10 is the primary of the transformer shunted across a non-inductive resistance 12 and 11 is the secondary of said transformer. The device 9 for producing constant potential difference is connected to the diaphragms and to the middle point of the secondary of the transformer. The current in the primary 10 must be small compared with the main current flowing through 12, if the pressure on the transformer secondary is to be practically proportional to the current in the main circuit at every instant. When measuring the potential across the points 1 and 2, by means illustrated in Fig. 1, it is possible to substitute for the two equal resistances 7 and 8 two equal condensers 28 and 29 as shown in Fig. 11, or two equal reactive coils 30 and 31, as shown in Fig. 12, but these could not be used when it is required to measure the current flowing in a circuit, as in this case the potential difference would not be proportional to the current.

Fig. 3 shows another arrangement of my invention which enables me to measure the potential across the two points 1 and 2. In this arrangement two equal sources of constant potential difference 9, 9 are connected in series, each giving a constant potential difference equal, say to P, so that added together they give a potential difference equal to 2P across the disks 3 and 4. The point 1 is connected to the diaphragms, and the point 2 to the junction of the two sources of potential difference 9, 9. Then if the potential difference across 1, 2 equals V, the potential difference between one disk or fixed body and its diaphragms is V+P, and that between the other diaphragm and its disk or fixed body is V−P. The difference in the pulls on the two diaphragms is then 4VP. I sometimes so arrange the apparatus that the potential difference across 1, 2 may be a fraction or a multiple of the potential difference I wish to measure.

Fig. 4 shows diagrammatically, the arrangement of my invention I use to measure the instantaneous power given to a circuit. In the main circuit is a non-inductive resistance 12 carrying the main current C and producing a potential C R across the two disks 3 and 4. To measure the instantaneous power given to the circuit between 1 and 2, I proceed as follows: The two diaphragms 5 and 6 are connected to the point 2. If the potential across 12 is V, and the potential across 1, 2 is P, then the pull on 5 will be proportional to $P^2$, and the pull on 6 will be proportional to $P^2+V^2+2PV$. The difference in the pulls will be proportional to $V^2+2PV$, and if V is small compared with P, then $V^2$ can be neglected and the difference in pulls is then proportional to PV, that is to the instantaneous power given to the circuit between 1 and 2.

A modification of the arrangement in Fig. 4 is shown in Fig. 5, where 12 is the resistance in the main circuit and 10 is the primary of a transformer connected across it. The secondary of the transformer 11, is connected across 3 and 4; the diaphragms 5 and 6 are connected through a condenser 13 to the point 2; and the middle point of the transformer secondary 11 is connected to 1. Then, if the primary 10 takes a very small current compared with the current in the resistance 12, and if its resistance is very small compared with its inductance, then the potential difference across 3 and 4 is proportional to the main current. The potential difference between the middle point of the secondary 11 and the diaphragm is always a definite proportion of the total potential across 1, 2, therefore, as hereinbefore stated, the difference in the pulls on the two diaphragms is proportional to the product of the current in the main circuit and of the potential difference across 1, 2, that is to the instantaneous value of the power being expended in the circuit 1, 2.

There are a great many ways in which I may connect the instrument so that the difference of the pulls of the diaphragm will be proportional to PV, where P is a fixed potential difference, and V is proportional to the potential across two points, or to the current flowing in a circuit. There are also a great many ways in which I may connect the instrument so that the difference of the pulls of the diaphragm is proportional to PV, where P is the potential difference across the circuit, and V is proportional to the current flowing in the circuit. The methods described above will serve as illustrations, but I do not limit myself to these. It is evident that in some cases the two diaphragms may be combined to form one diaphragm and the difference of the two pulls on the one diaphragm be then measured, such as illustrated in Fig. 10, the reasoning applicable to the preceding cases being also applicable to this one.

In the construction shown in Fig. 10, I replace the two diaphragms 5 and 6 by one diaphragm 5, placed between the two disks or fixed bodies 3 and 4, which have openings at their centers to allow of the free passage of a filament 26, 27, which is attached to the diaphragm. The ends of the filament are connected respectively with springs at 26 and 27 so as to be under tension. The filament is also passed about a spindle 25 which carries a small mirror 22, which will be rotated through an angle proportional to the displacement of the diaphragm.

Figs. 6, 7 and 8 show one arrangement of means which enable me to measure the difference of the pulls on two diaphragms 5 and 6. In Fig. 6 is shown a single element of the differential arrangement for measuring the difference in pulls between the two diaphragms. Two wires or filaments 14, 15 and 16, 17 are looped over each other. At 14 the wire 14, 15 is fixed independent of the diaphragm 5, and at 15 it is attached to the diaphragm 6. At 17 the wire 16, 17 is fixed independent of the diaphragm 6, and at 16 it is attached to the diaphrgm 5. It is now evident that if the diaphragm 5 moves away from the wires it will tend to make the center point of the wires move forward in the direction of the arrow, but if 6 moves away from the wires it will make the middle point move in a direction opposite to the arrow. If the pulls of both diaphragms are equal, there would be practically no motion, but only a slight stretching of the wires. If now an exactly similar set of wires 18, 19, 20, 21, is placed behind the wires 14, 15 and 16, 17, as shown in Fig. 7, but so that the motion of the wires corresponding to any motion of the diaphragms is the reverse to that in 14, 15 and 16, 17 then a small mirror 22 placed across the two sets of wires, as shown, will have a rotary motion and the angle of rotation for small angles will be proportional to the difference in the movements of the diaphragms and therefore to the difference in the pulls. Another view of the arrangement shown in Fig. 7 is shown in Fig. 8. In this view, looking straight on to the mirror M, the wires 16, 17 and 18, 19 only are shown, as the wires 14, 15 and 20, 21 are behind them.

Fig. 9 shows another arrangement by which I may measure the difference in the pulls on the diaphragms. A filament or wire 23, 24 passes around a small rod or spindle 25 and is attached at one end to one diaphragm and at the other end to the other diaphragm. In this case the spindle 25 is free to rotate and will measure the difference of pulls by the angle of rotation. A small mirror 22 may be secured to the spindle to indicate in the usual manner the angle of rotation. I do not limit myself to these arrangements, but may employ any well-known means adapted for measuring the difference in the pulls on the two diaphragms, or the resultant on the pulls of one diaphragm under such conditions.

To enable me to use higher pressures without risk of a breakdown between the diaphragms and the disks, I may place between them sheets of insulation, as indicated at 33 in Fig. 4, or else immerse the whole of the instrument in a tank of oil, as shown at 32 in Fig. 10. In this latter case I can use the oil to dampen the motion of the mirror. In some cases I inclose the instrument in an air-tight case 34, Fig. 3, and pump in air at high pressure between the diaphragms and the disks, so that the strain which the air will stand before breaking down is increased.

While my improved apparatus may be made in a variety of ways, the measuring device itself may be conveniently made in the form shown in Figs. 13 and 14 in which the two fixed disks 3 and 4 are separated from the diaphragms 5 and 6 by means of insulating rings or bushings 32 and 33 arranged within an inclosing case 34. The diaphragm stretching rings 40 and 41 are held apart and carried by the pillars 38 and 39. In the side of the vessel 34 there is a vertical window 37 indicated more fully in Fig. 14 and in dotted lines in Fig. 13, through which a beam of light is projected on to the mirror 22 which is carried by the wires, in the manners indicated in Figs. 7 and 8. In these figures the wires 16, 17, 18 and 19 are shown in elevation and looking toward the face of the mirror. The beam of light which is projected upon the mirror is reflected back on to any suitable instrument for observing and recording its movement. The wire 18 is shown as connected to the cross rod 35 acting as an abutment, whereas the wire 17 is connected to a cross wire 36. The wires 14 and 21 are likewise respectively connected with the rods 35 and 36, but are not shown in Fig. 13 since they are back of other wires. These bars 35 and 36 may be carried by the rings 40 and 41 respectively.

Where I have referred to sources of electro-motive force represented at 9, such may be answered by the use of batteries of high electro-motive force, namely, by a battery having a large number of cells connected in series, the number being optional. The terminals 1 and 2 of the circuits, the characteristics of whose current is to be measured, may be connected with a main source of supply such as an alternator, as indicated at A in Figs. 1 to 5 and 11 and 12. By this means and by making the natural frequency of the diaphragms and wires as high as possible I arrange that the displacement of the mirror is proportional to the quantity to be measured.

In the construction of instrument herein described, the employment of the two stretched metallic diaphragms and the two fixed disks or bodies constitutes two electro-static couples and these are so combined with means that the line current at the points to be measured energizes them to different degrees to produce a difference in their electro-static pressures. This causes their diaphragms to produce different pulls, which are indicated by suitable means. The proper proportioning of the parts enable the difference in pulls to be proportional to the potential difference across two points in an electric circuit, or to the current flowing in such circuit at said points, or the power given to such circuit between said points.

I have described my invention in the best form for adaption in commercial use, but I do not limit or restrict myself to the details as these may be modified in various ways without departing from the spirit of the invention.

Having now described my invention what I claim as new and desire to secure by Letters Patent, is:

1. An instrument for measuring the difference in instantaneous pressures of a current existing at two separate points in an electric circuit, consisting of two stretched diaphragms and two fixed bodies forming two electro-static couples, combined with means supporting the two electro-static couples in fixed relation, and connecting means between them for indicating the difference in the electro-static condition of the two couples.

2. In a device for measuring the difference in characteristics of an electric current at different points in an electric circuit, the combination of two electro-static couples each consisting of a fixed body and a movable inductable diaphragm surface parallel to said fixed body, with terminal means for each of the fixed bodies, terminal means for the inductive diaphragm surfaces of the two couples, and means for indicating the extent of the inductive pulls of the two fixed bodies upon the induction diaphragm surfaces of the two couples.

3. In a device for measuring the difference in characteristics of an electric current at different points in an electric circuit, the combination of two electro-static couples each consisting of a fixed body and a movable inductable diaphragm surface parallel to said fixed body, with terminal means for each of the fixed bodies, terminal means for the inductive diaphragm surfaces of the two couples, an inclosing vessel containing an insulating fluid, and means for indicating the extent of the inductive pulls of the two fixed bodies upon the induction diaphragm surfaces of the two couples.

4. A device for measuring the difference in characteristics of an electric current, which consists of two electro-static couples, and terminal means for each of said couples, combined with a source of electric energy of constant potential for energizing one of the elements of each electro-static couple, and means operating by the joint action of the two electro-static couples to indicate the induction produced in the respective couples, and means for maintaining a greater resistance between the elements of the couples than that of the atmosphere.

5. A device for measuring the difference in characteristics of an electric current, which consists of two electro-static couples, and terminal means for each of said couples, combined with a source of electric energy of constant potential for energizing one of the elements of each electro-static couple, and means operating by the joint action of the two electro-static couples to indicate the different electro-static characteristics of the couples, and means for maintaining a greater resistance between the elements of the couples than that of the atmosphere consisting of a body of oil in which the electro-static couples are immersed.

6. In a device for measuring the difference in characteristics of an electric current, the combination of two fixed bodies, two stretched diaphragms forming with the fixed bodies two electro-static couples, terminal means for the diaphragms and fixed bodies of said two electro-static couples, a source of electric energy of constant potential for energizing one of the elements of each electro-static couple, and means common to both couples for indicating the difference in the electro-static pressures of the two couples.

7. An instrument for measuring the difference in characteristics of a current existing at two separate points in an electric circuit, consisting of two stretched diaphragms and two fixed bodies forming two electro-static couples, combined with terminals for each of said couples, a source of electric energy of constant potential for energizing one of the elements of each electro-static couple, and means connecting the two electro-static couples for indicating the difference in the electro-static condition of the two couples.

8. An instrument for measuring the difference in characteristics of a current existing at two separate points in an electric circuit, consisting of two diaphragms and two fixed bodies forming the elements of two electro-static couples, combined with a terminal connecting with the diaphragms of the respective electro-static couples and separate terminals respectively connecting with the two fixed bodies whereby the difference in the electro-static condition of the two couples may be indicated.

9. In an instrument for measuring the instantaneous pressure difference across two points in an electric circuit, the combination of two electro-static couples each composed of a diaphragm and a fixed body having relative relation whereby the fixed body affects the diaphragm by induction, with separate terminal means connecting with the diaphragms and with the two fixed bodies, a source of electric energy of constant potential for energizing one of the elements of each electro-static couple, and means for indicating the movement of the diaphragm.

10. In an instrument for measuring the instantaneous pressure differences across two points in an electric circuit, the combination of two electro-static couples each consisting of a stretched diaphragm and a fixed body respectively arranged to affect the diaphragm by induction, with terminal means connecting with the diaphragms, terminal means respectively in connection with two fixed bodies, a source of electric energy of constant potential for energizing one of the elements of each of the electro-static couples, and means operated by the two electro-static couples for indicating the difference in the electro-static condition of the two couples.

11. In an instrument for measuring the instantaneous difference in pressures of two points in an electric circuit, the combination of two electro-static couples each comprising a stretched diaphragm and a fixed body in inductive relation thereto, common terminal means connected with both stretched diaphragms, separate terminal means connected with each of the fixed bodies, and means for the two electro-static couples for indicating electro-static changes in their condition.

In testimony of which invention, I have hereunto set my hand.

J. T. IRWIN.

Witnesses:
Philip O'Hagan,
John J. Bowler.

---

Copies of this patent may be obtained for five cents each, by addressing the "Commissioner of Patents, Washington, D. C."